United States Patent [19]

Skarbo et al.

[11] Patent Number: 5,852,807
[45] Date of Patent: *Dec. 22, 1998

[54] METHOD AND APPARATUS FOR MODELING BUSINESS CARD EXCHANGES IN A POINT-TO-POINT OR A MULTI-POINT PERSONAL COMPUTER CONFERENCE

[75] Inventors: Rune A. Skarbo, Hillsboro; John D. Elliott, Aloha; Anthony C. Salvador, Portland, all of Oreg.

[73] Assignee: Intel Corporation, Santa Clara, Calif.

[ * ] Notice: The term of this patent shall not extend beyond the expiration date of Pat. No. 5,506,954.

[21] Appl. No.: 908,751

[22] Filed: Aug. 8, 1997

Related U.S. Application Data

[63] Continuation of Ser. No. 444,020, May 18, 1995, abandoned, which is a continuation-in-part of Ser. No. 151,694, Nov. 24, 1993, Pat. No. 5,506,954.

[51] Int. Cl.[6] .................................................. G06F 17/60
[52] U.S. Cl. ...................................... 705/7; 705/9; 705/10
[58] Field of Search .................................. 705/1, 7, 9, 10

[56] References Cited

U.S. PATENT DOCUMENTS

| | | | |
|---|---|---|---|
| 5,025,395 | 6/1991 | Nose et al. | 364/518 |
| 5,226,117 | 7/1993 | Miklos | 395/157 |
| 5,493,105 | 2/1996 | Desai | 235/375 |
| 5,500,929 | 3/1996 | Dickinson | 395/160 |
| 5,506,954 | 4/1996 | Arshi et al. | 395/162 |

FOREIGN PATENT DOCUMENTS

| | | | |
|---|---|---|---|
| 9417479 | 8/1994 | WIPO | G06F 15/21 |

*Primary Examiner*—Emanuel Todd Voeltz
*Assistant Examiner*—Barton L. Bainbridge
*Attorney, Agent, or Firm*—Blakely, Sokoloff, Taylor & Zafman LLP

[57] ABSTRACT

The conference manager and address service of a general purpose personal conference application are enhanced with a plurality of functions for setting up, exchanging, saving, retrieving and re-sending "business cards" electronically. The external manifestation of an electronic "business card" is a visual presentation of information commonly found on physical business cards in a format that resembles a physical business card. Preferably, the visual presentation also includes a picture of the person named. Internally, the information including the data necessary to render the picture are maintained in data structures.

28 Claims, 16 Drawing Sheets

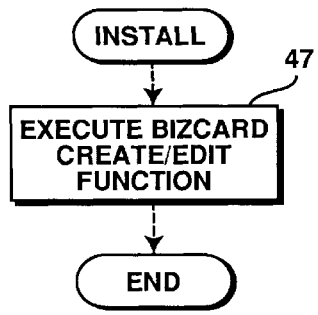
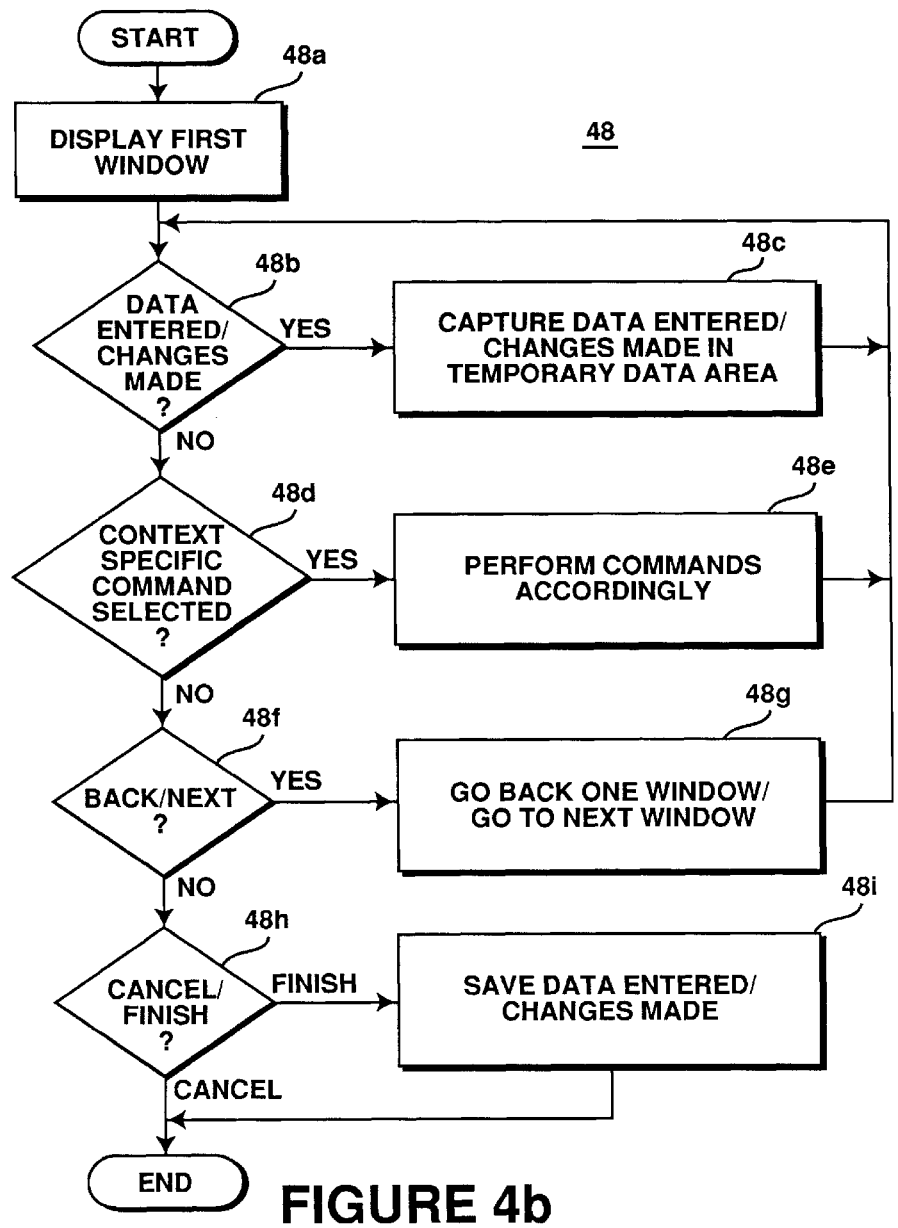
FIGURE 4a
FIGURE 4b

FIGURE 5d

METHOD AND APPARATUS FOR MODELING BUSINESS CARD EXCHANGES IN A POINT-TO-POINT OR A MULTI-POINT PERSONAL COMPUTER CONFERENCE

This is a continuation of application Ser. No. 08/444,020, filed May 18, 1995, now abandoned which is a continuation-in-part of application Ser. No. 08/151,694, filed Nov. 24, 1993, now U.S. Pat. No. 5,506,954.

BACKGROUND OF THE INVENTION

1. Field of the Invention

The present invention relates to the field of personal computer (PC) conferencing. More specifically, the present invention relates to modeling participant behavior of traditional face-to-face conferences in PC conferences.

2. Background Information

As advances in telecommunication and computing technology continue to bring forth more powerful PC conferencing systems, both users and system integrators desire closer modeling of participant behaviors of traditional face-to-face conferences in PC conferences. One particular behavior of interest is the practice of conference participants exchanging business cards in face-to-face conferences. The business cards not only serve as vehicles of introduction, they also serve as information sources. It is not uncommon for conference participants to save the exchanged business cards and refer to them later on.

The conference participants may refer to the saved business cards for a variety of reasons. Sometimes, the conference participants may be referring to the saved business cards simply to remind them of the persons they met, including the fellow participant's affiliations, titles, etc. Other times, the conference participants may be referring to the saved business cards to figure out the roles, the interests, etc. of the fellow participants in attending particular conferences or advocating particular points of views, through the affiliations, titles etc. information. Yet other times, the conference participants may be referring to the saved business cards as a resource for someone to whom they themselves can turn or refer colleagues, clients etc. to consult on certain subject matters.

In sum, notwithstanding the limited amount of information typically contained in a business card, its utility is amazingly broad. In fact, it is a common practice for professionals in a variety of disciplines to routinely enter the information in business cards into their address databases for subsequent retrieval for the purposes described earlier, and/or for mailing of announcements, seasonal greeting cards etc.

Thus, it is desirable to be able to model business card exchanges for conference participants of a PC conference. It is further desirable to be able to capture the information in the exchanged "business cards" for subsequent retrieval. As will be disclosed in more detail below, the method and apparatus of the present invention achieves these and other desirable results.

SUMMARY OF THE INVENTION

The conference manager and address service of a general purpose personal conference (GPPC) application are enhanced with a plurality of functions for setting up, exchanging, saving, retrieving, browsing, and re-sending "business cards" electronically, thereby modeling the business card exchange behavior of conference participants of face-to-face conferences. Under the present invention, the external manifestation of an electronic "business card" (hereinafter simply "bizcard") is a visual presentation of information commonly found on physical business cards in a format that resembles a physical business card. Preferably, the visual presentation also includes a picture of the person named. Internally, the information including the data necessary to render the picture are maintained in data structures, thereby allowing the information captured to be searchable for subsequent retrieval.

The functions include a first function for automatically transmitting a user's bizcard whenever the user joins a PC conference, and a second function for receiving, displaying and saving received bizcards while the user is participating in a PC conference. In some embodiments, the functions further include a third function for setting up a bizcard for the user at system installation time, and subsequently editing the bizcard. While in other embodiments, the functions additionally/alternatively include a fourth function for retrieving and browsing the saved bizcards, and optionally re-sending the retrieved bizcards.

BRIEF DESCRIPTION OF DRAWINGS

The present invention will be described by way of exemplary embodiments, but not limitations, illustrated in the accompanying drawings in which like references denote similar elements, and in which:

FIGS. 4a–4b illustrate the operational flow of one embodiment of the additional functions incorporated in the conference manager of FIG. 2 for setting up and editing a bizcard for a user;

Figure 5D:
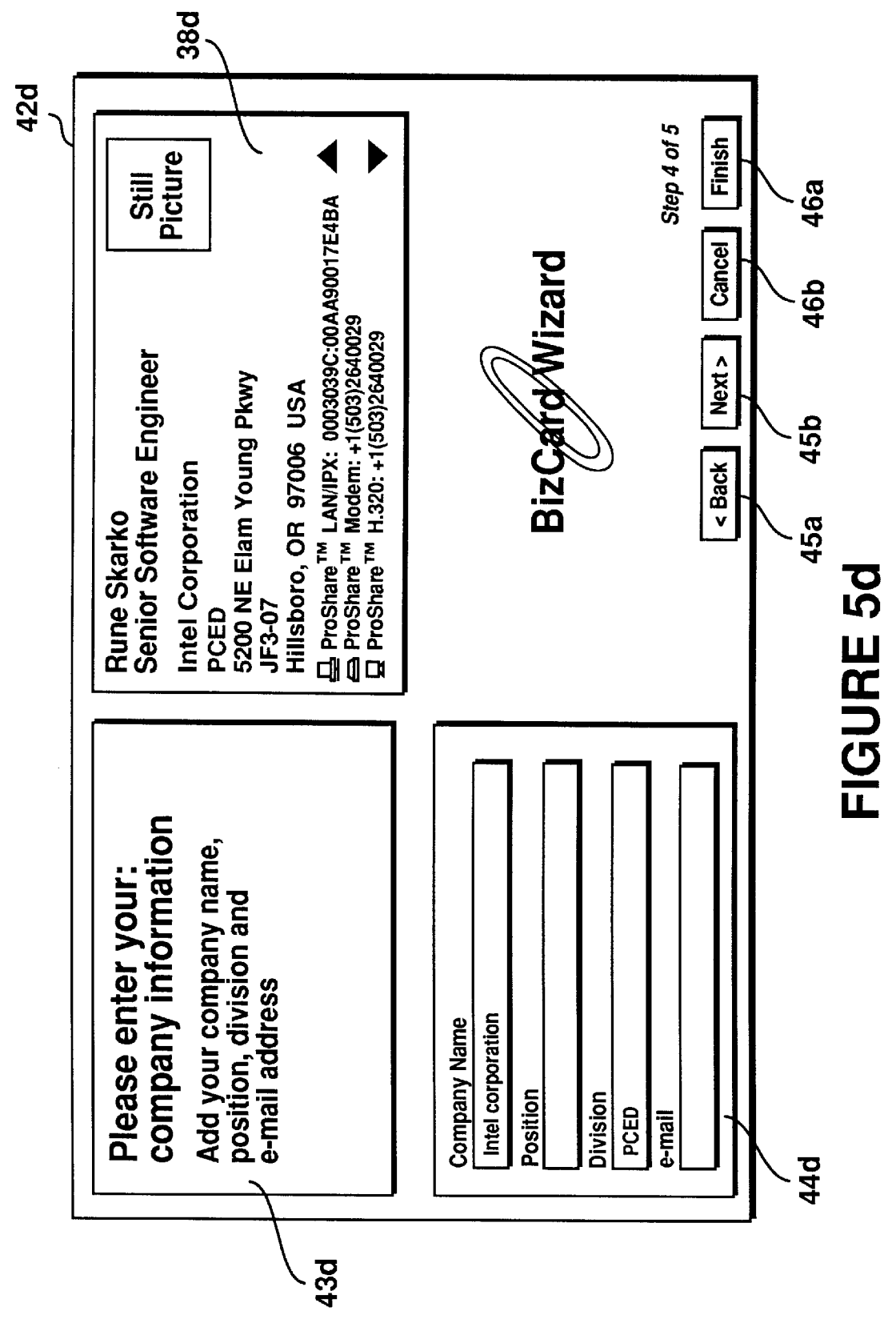

FIGS. 5a–5e illustrate one embodiment of the end user interfaces employed by the additional functions illustrated by FIG. 4a–4b;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1A:
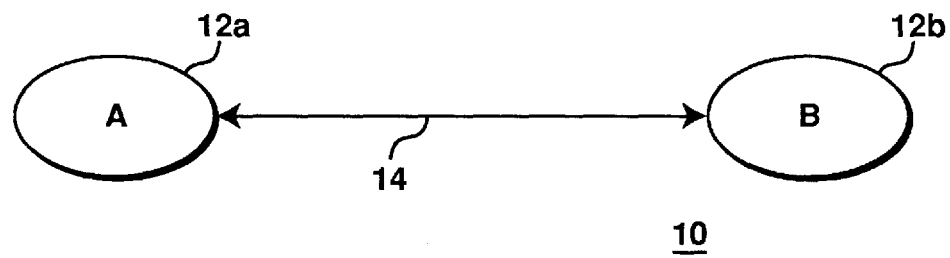
FIGS. 1a & 1b illustrate a typical point-to-point and a typical multipoint PC conference incorporating the teachings of the present invention.
Figure 1B:
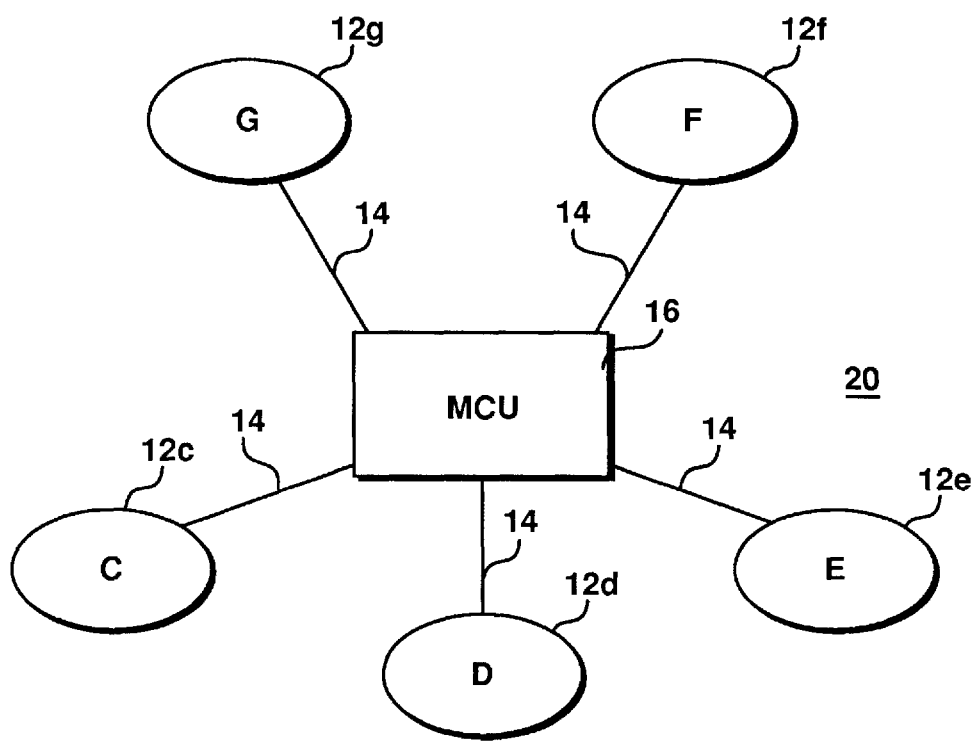

Referring now to FIGS. 1a & 1b, two exemplary networks of PC conferencing systems incorporated with the teachings of the present invention are illustrated. FIG. 1a illustrates an exemplary point-to-point PC conferencing system 10, whereas FIG. 1b illustrates an exemplary multi-point PC conferencing system 20. Point-to-point PC conferencing system 10 comprises PC A & B 12a and 12b connected to each over via POTS, ISDN or LAN 14, whereas multi-point PC conferencing system 20 comprises PC C-G 12c–12g and multi-point control unit (MCU) 16 connected to each other also via POTS, ISDN or LAN 14. PC A 12a and PC B 12b are joined together in conference when one of the two PC's 12a or 12b call the other. PC C-G 12c–12g are joined together in conference via MCU 16 when PC's 12c–12g individually call MCU 16.

While for ease of explanation, exemplary multi-point PC conferencing system 20 is illustrated with all PC C-G 12c–12g joined in conference via one MCU 16, based on the description to follow, it will be appreciated that the present invention may be practiced with multi-point PC conferencing system employing one or more MCU's 16. Furthermore, MCU 16 may be managing multiple multi-point PC conferences.

In the presently preferred embodiments, PC A-G 12a–12g and MCU 16 are all equipped with i486 or Pentium® class processors manufactured by the assignee of the present invention. Each of PC A-G 12a–12g and MCU 16 is also equipped with communication interface(s) and storage medium. PC A-G 12a–12g are further equipped with audio/video subsystems. Communication interfaces, storage medium, and audio/video subsystems may be implemented with any number of such elements well known in the art.

MCU 16 is equipped with multi-point control software having capabilities similar to the MCUs employed in AT & T's WorldWorx[SM] service provided by AT & T of New Jersey. PC A-G 12a–12g are all equipped with identical general purpose personal conference (GPPC) applications incorporated with teachings of the present invention. The base conferencing functions of each GPPC application are similar to those offered by the ProShare™ Personal Conferencing System manufactured by the assignee of the present invention. The extended conferencing functions of the present invention for setting up, exchanging, saving, retrieving, browsing, and re-sending bizcards will be described in more detail below. For a more detail description of XYZ and ProShare™, refer to their respective product literature's.

Figure 2:
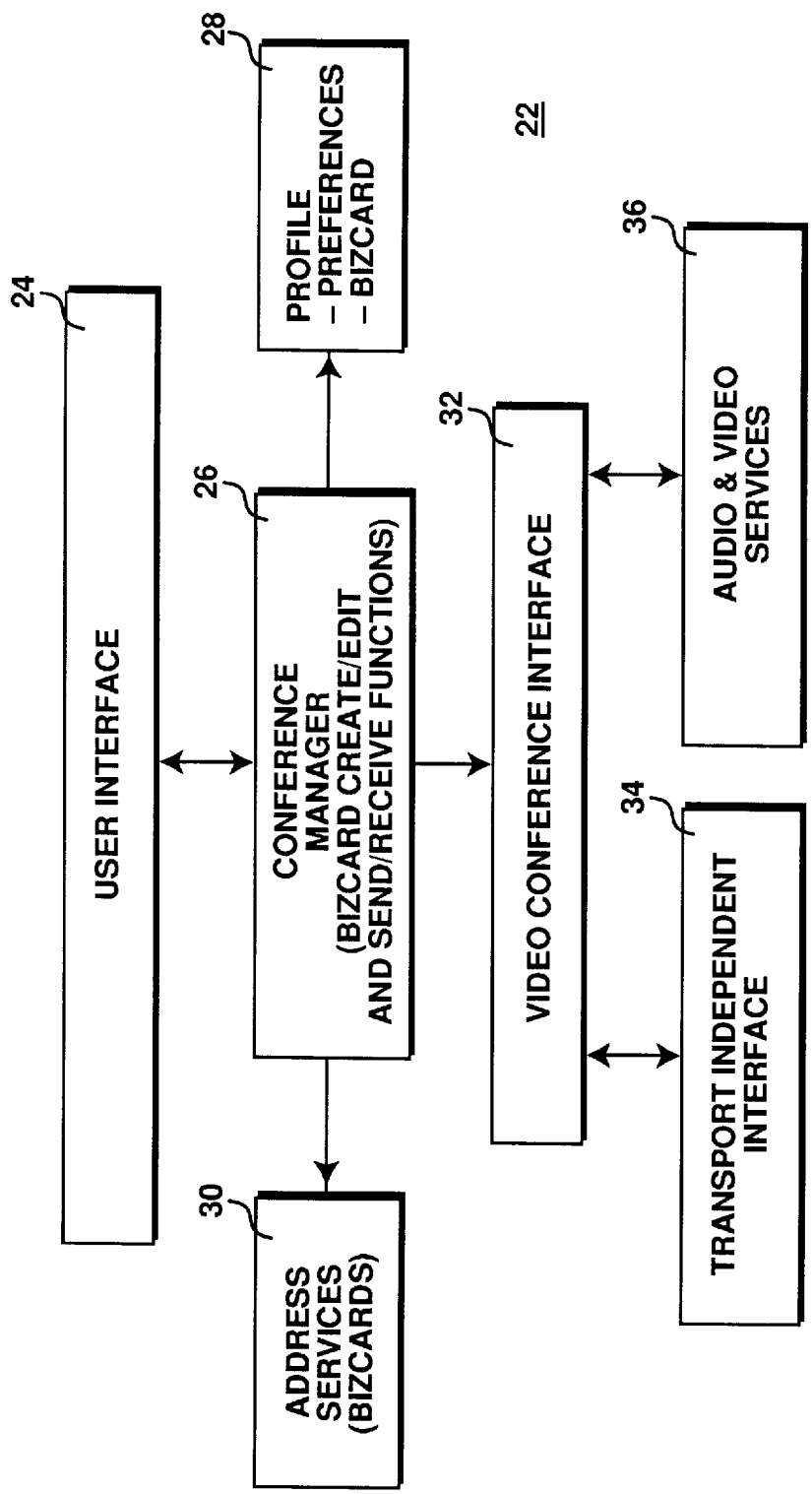
FIG. 2 illustrates one embodiment of a GPPC application incorporated in each of the PC's of FIG. 1a & 1b.

FIG. 2 illustrates one embodiment of a GPPC application incorporated with the teachings of the present invention in further detail. As shown, for this embodiment, GPPC application 22 comprises user interface 24, conference manager 26, profile data 28 and address services 30. Furthermore, GPPC application 22 comprises transport independent services 34, extended A/V services 36, and an "integrated" interface 32 to these services 34 and 36. In the presently preferred embodiment, GPPC application 22 is implemented in an object-oriented manner using the programming language $C_{++}$.

User interface 24 provides display windows with menus, buttons etc. for interacting with a user. In particular, in accordance to the present invention, use interface 24 includes enhancements for facilitating set up, exchange, retrieval, browse and re-send of bizcards. Conference manager 26 manages personal conferences including the conferencing applications. In particular, in accordance to the present invention, conference manager 26 also manages automatic exchange of bizcards between the user and other conference participants, and saving the exchanged bizcards. Preferably, conference manager 26 also assists a user in setting up his/her bizcard at installation time. Profile 28 stores various user preferences. In particular, in accordance to the present invention, profile 28 includes the user's bizcard and the user's preference on whether a received bizcard is to be displayed automatically. Address services 30 provide services related to managing connection addresses for conference participants. In particular, in accordance to the present invention, address services 30 include services for retrieving, browsing and re-sending of retrieved bizcards. The above described enhancements, functions, and services in accordance to the present invention will all be described in further detail below.

Transport independent services 34 provide connection services on multiple transport media and multiple connections. A/V services 36 provide sampling, digitization, compression/decompression of audio signals exchanged, as well as capture and playback services for video streams including interfacing with the proper CODEC to compress and decompress the video signals. Integrated interface 32 provides abstraction of these transport and A/V services, enabling the serviced application to perform call management, data and/or file channel management, and A/V streams management. These and other related services are known in the art, and therefore will not be described in further detail.

Figure 3A:
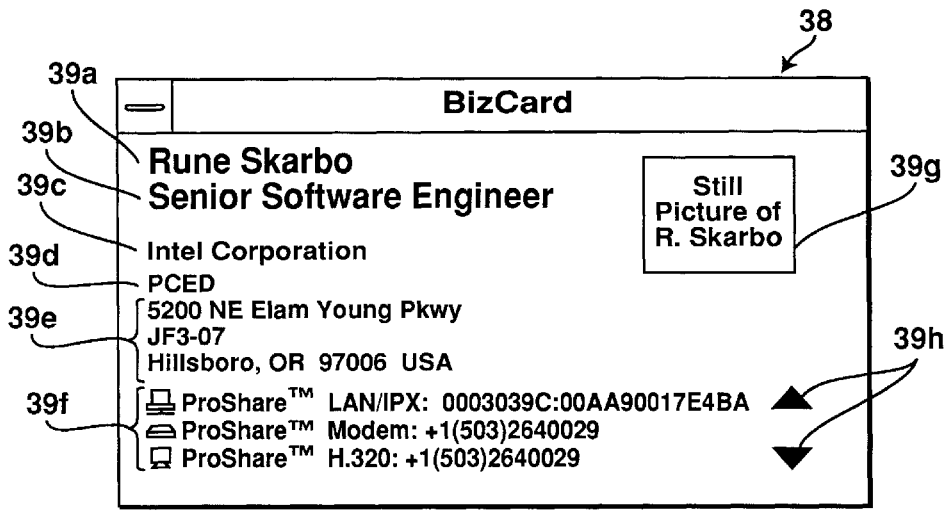
FIGS. 3a & 3b illustrate the external manifestation and internal representation of the bizcard of the present invention.
Figure 3B:
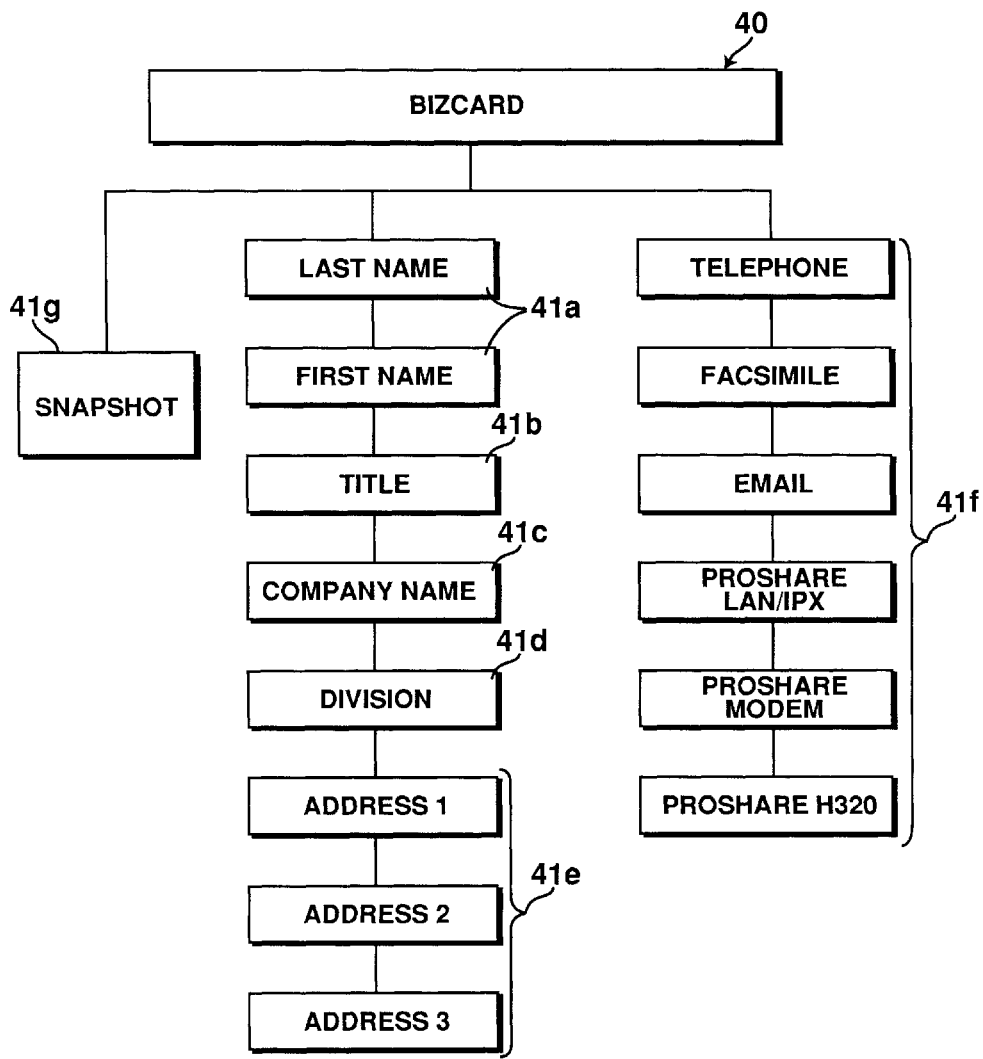
Figure 5A:
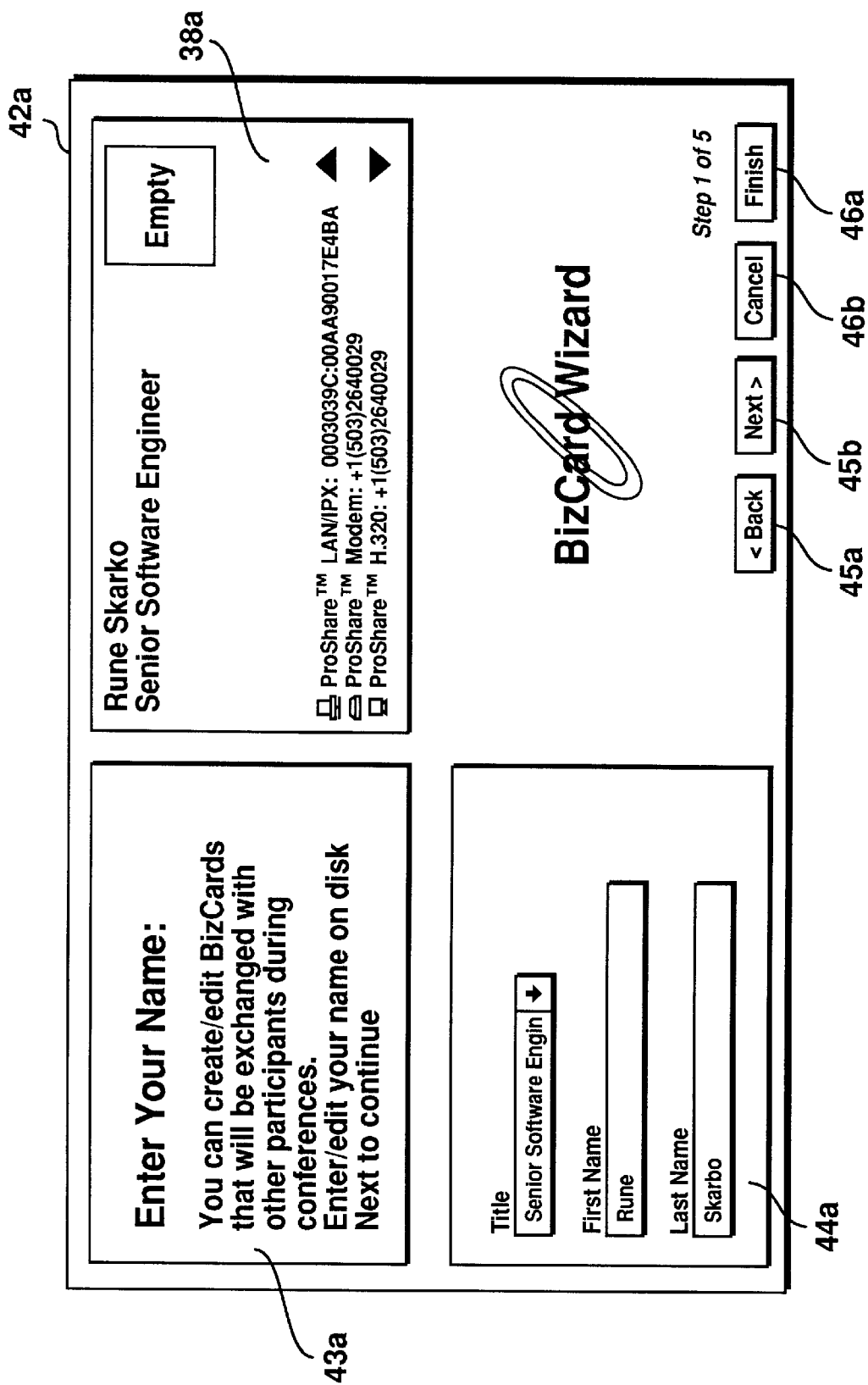
Figure 5B:
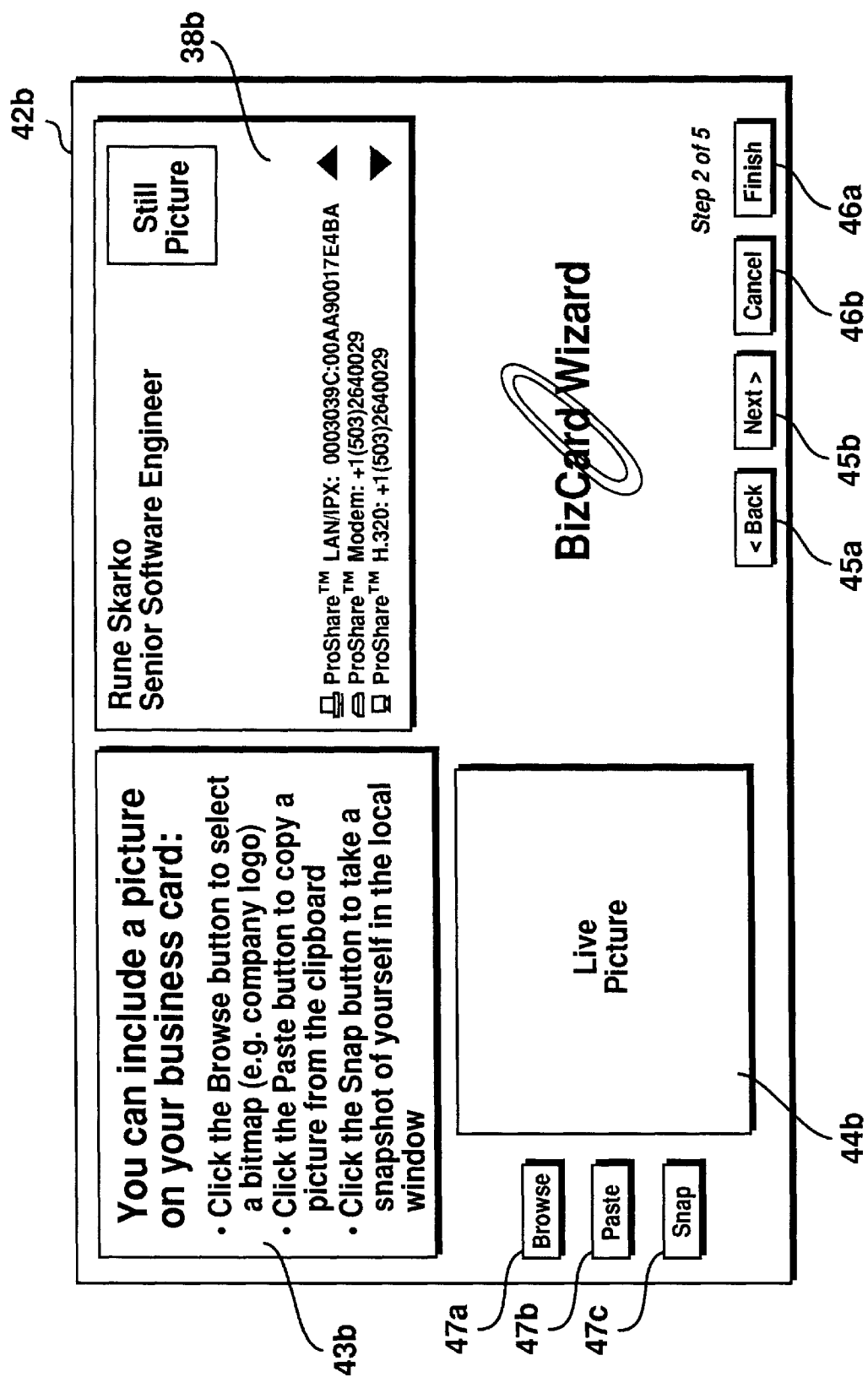
Figure 5C:
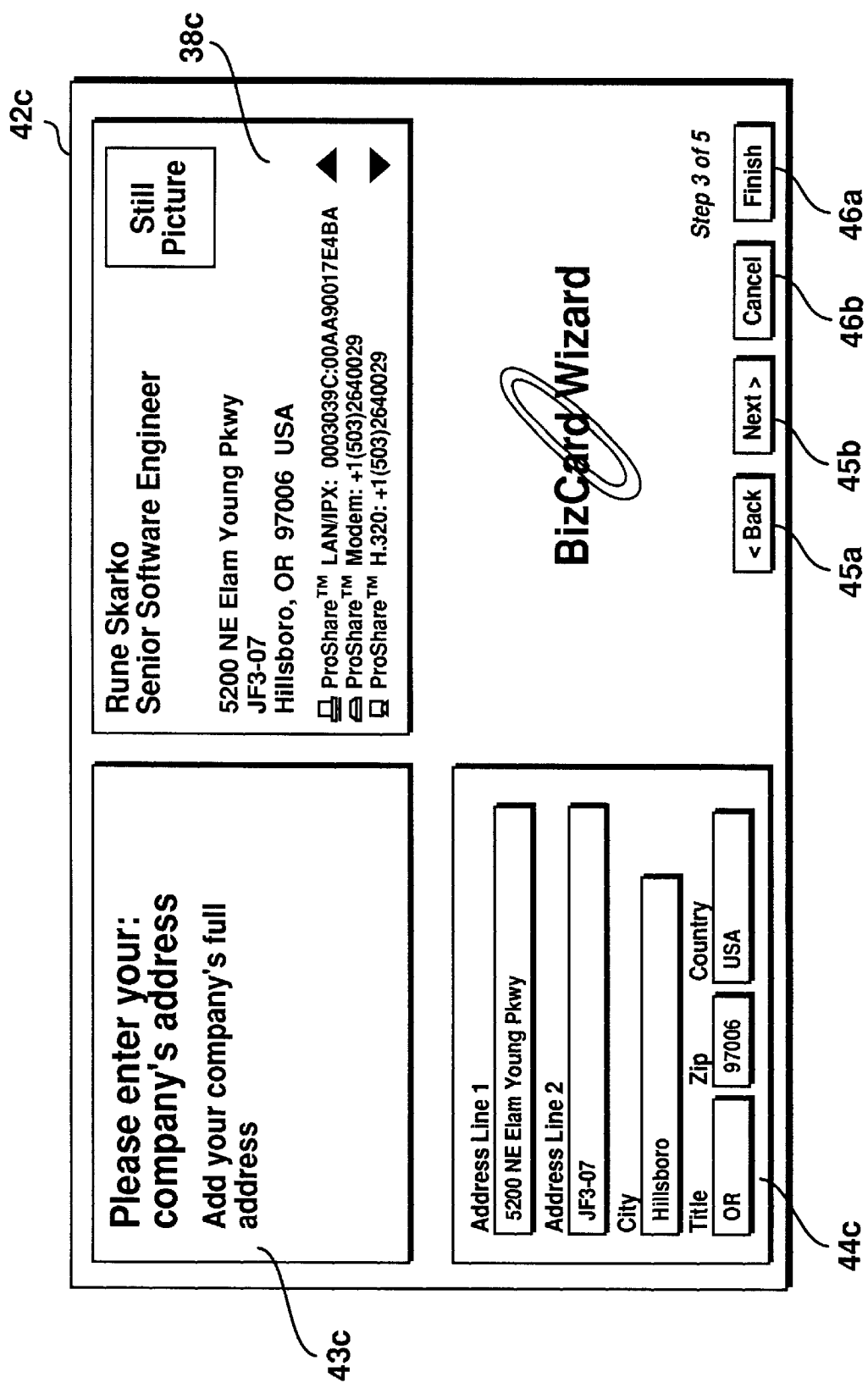
Figure 5E:
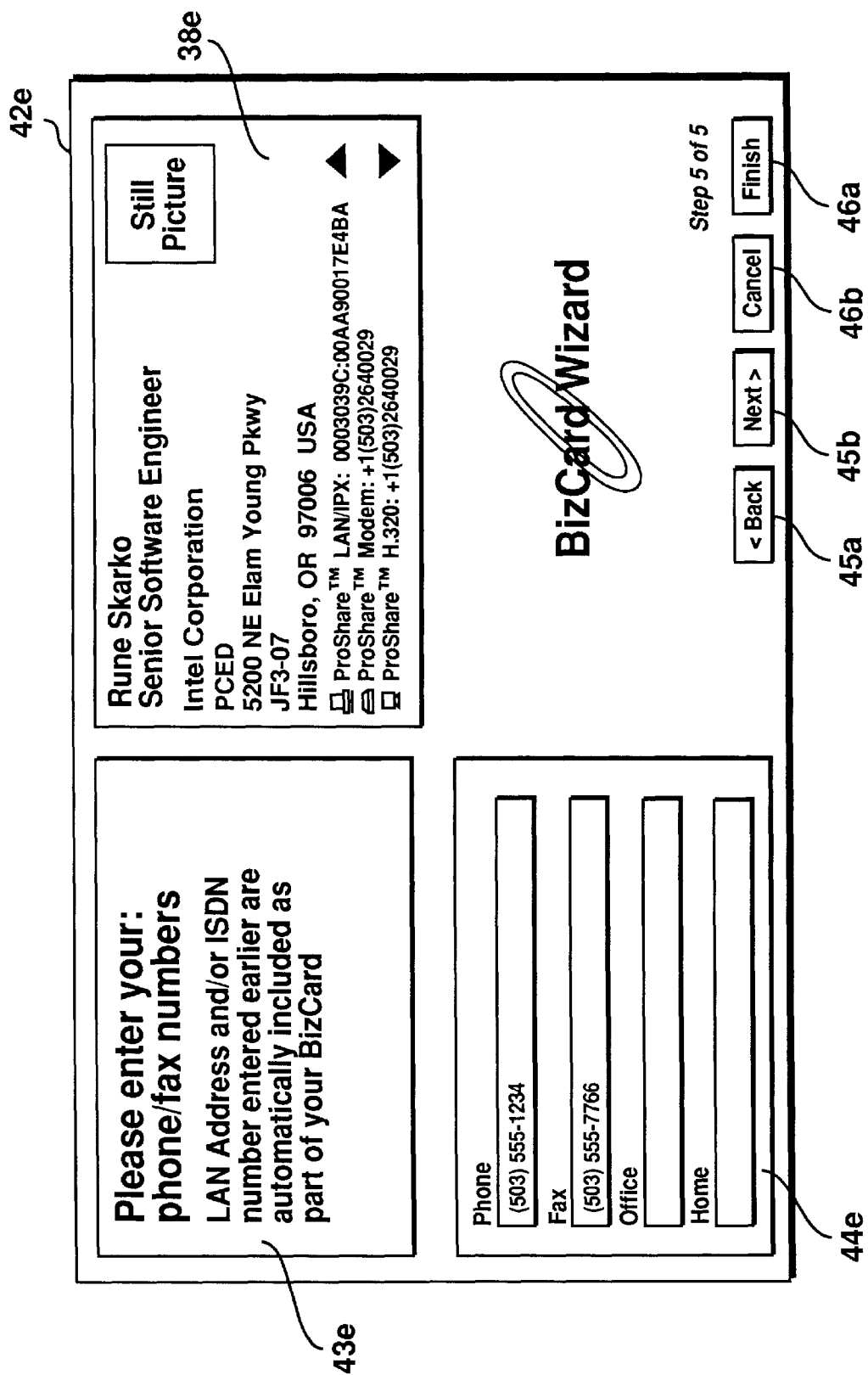

FIGS. 3a & 3b illustrate the external manifestation and internal representation of a bizcard of the present invention. As shown in FIG. 3a, the external manifestation is a visual representation 38 of information commonly found on physical business cards in a format that resembles a physical business card. These information include name 39a, title 39b, company 39c, division 39d, address 39e, phone numbers 39f etc. Preferably, the phone numbers 39f include all personal conferencing phone numbers/network addresses, in addition to conventional voice and facsimile phone numbers, and the phone numbers are scrollable 39h. Furthermore, the visual presentation 38 includes a picture 39g of the person named. Alternatively, a company logo may be included.

As shown in FIG. 3b, internally, the information including the data necessary to render the picture 41g are maintained in data structures 40. Data structures 40 include data elements 41a–41g necessary to store the captured information. Data necessary to render the picture 41g may be stored in any number of graphics format well known in the art.

Referring now to FIGS. 4a–4b, wherein the operational flow of one embodiment of the additional functions incorporated in conference manager 26 for setting up a user's bizcard 38 is shown. As shown in FIG. 4a, as part of the install process, a bizcard create/edit function is invoked, step 47. As shown in FIG. 4b, when invoked, the bizcard create/edit function displays a first input window including instructions to the user, general navigational/control commands, context specific commands, and input areas for accepting user inputs, step 48a. If the inputs are data entered or changes made, the bizcard create/edit function captures the data entered or changes made in temporary storage area, step 48c. On the other hand, if the user selects certain context specific commands, the bizcard create/edit function then performs the selected commands accordingly, step 48e. However, if the user selects a navigational command, such as going back one window or going forward to the next window, the bizcard create/edit function refreshes the display with the appropriate window, step 48g. Finally, if a cancellation control command is selected, the bizcard create/edit function exits without saving the data entered or changes made first, whereas if a normal exit control command is selected, the bizcard create/edit function saves the data entered or changes made first before exiting, step 48i.

FIGS. 5a–5e illustrate one embodiment of the user interfaces employed by the bizcard create/edit function illustrated by FIG. 4a–4b. As shown, under this embodiment, all windows 42a–42e comprise instructions to the user 43a–43e, navigation commands (Back, Next) 45a–45b, normal/exceptional termination control commands (Cancel, Finish) 46a–46b, data input areas 44a–44e, and a visual representation of the bizcard 38a–38e being set up. Additionally, a window may have window specific commands. For example, window 42b has exemplary window specific commands Snap, Browse and Paste 47a–47c. Snap 47a causes a snapshot of the user to be taken using the video devices of the system, and the snapshot to be used as the picture to be incorporated in bizcard 38. Alternatively, Browse 47b is used to display and select an existing picture or logo (more specifically, a file containing the desired picture or logo), and Paste 47c is used to incorporate the selected picture or logo in bizcard 38.

Figure 6A:
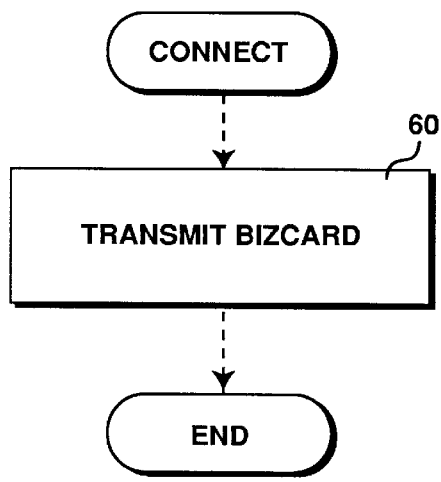
FIGS. 6a–6b illustrate the operational flow of one embodiment of the additional functions incorporated in the conference manager of FIG. 2 for automatically exchanging bizcards with other conference participants.
Figure 6B:
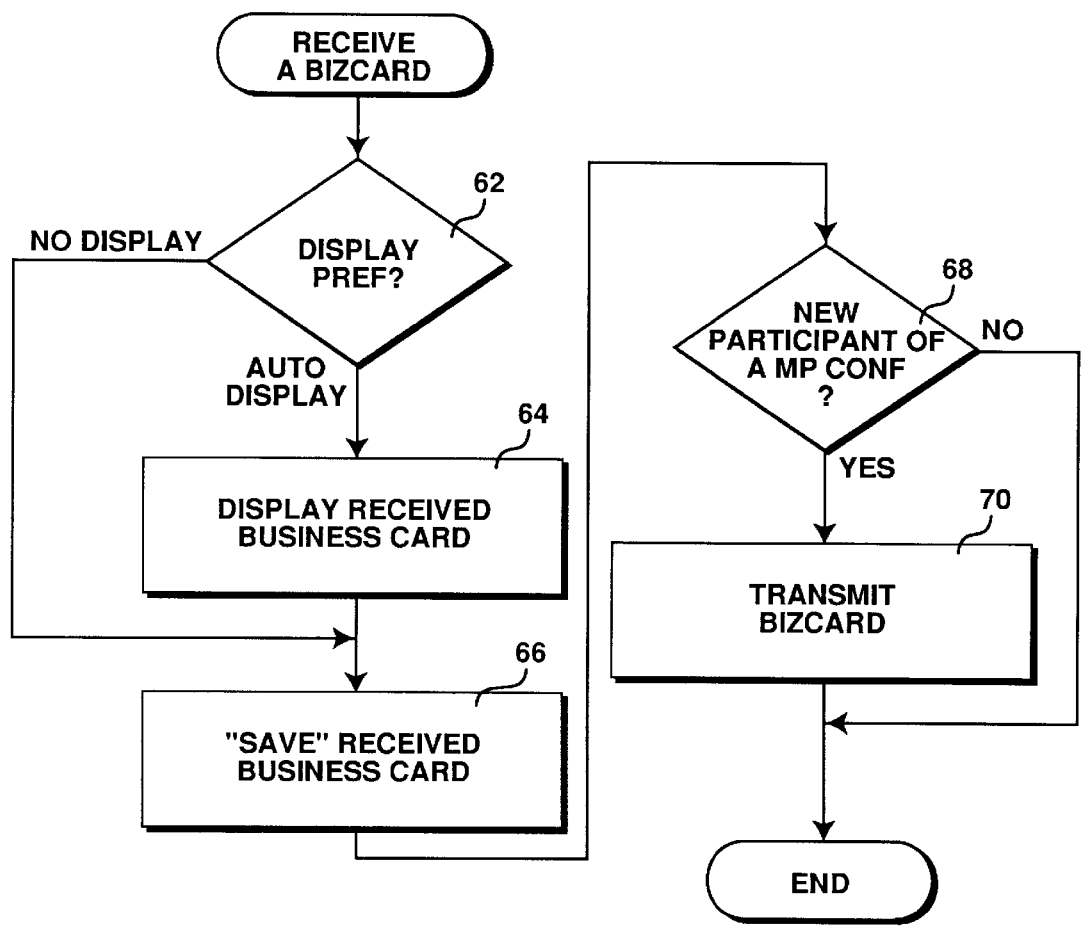

Referring now to FIGS. 6a–6b, wherein the operational flow of one embodiment of the additional functions incorporated in conference manager 26 for exchanging bizcards 38 with other conference participants are shown. As illustrated in FIG. 6a, under this embodiment, as part of the response to a connect event, conference manager 26 automatically transmits the user's bizcard 38 to its counterpart in a point-to-point PC conference or to the MCU 16 in a multi-point PC conference, which in turn transmits the bizcard 38 to all other conference participants. As illustrated in FIG. 6b, conference manager 26 conditionally displays the received bizcard 38, depending on the user's display preference setting, steps 62–64. Additionally, conference manager 26 saves the received bizcard 38 in address service 30, step 66. Preferably, a new data structure 40 is created only if the received bizcard 38 is a new bizcard 38. For a previously saved bizcard 38, the newly received information are simply merged into the existing data structure 40.

Additionally, for multi-point PC conferences, conference manager 26 further determines if the received bizcard 38 is from a "new" conference participant, i.e. someone who is in the process of joining the multi-point PC conference, step 68. (In other words, the received bizcard 38 is not a response to the bizcard 38 sent out by the user, while the user himself/herself is joining the multi-point PC conference.) If the received bizcard 38 is from a "new" conference participant, conference manager 26 responds by transmitting his/her bizcard 38 to the "new" conference participant, step 70.

Figure 7A:
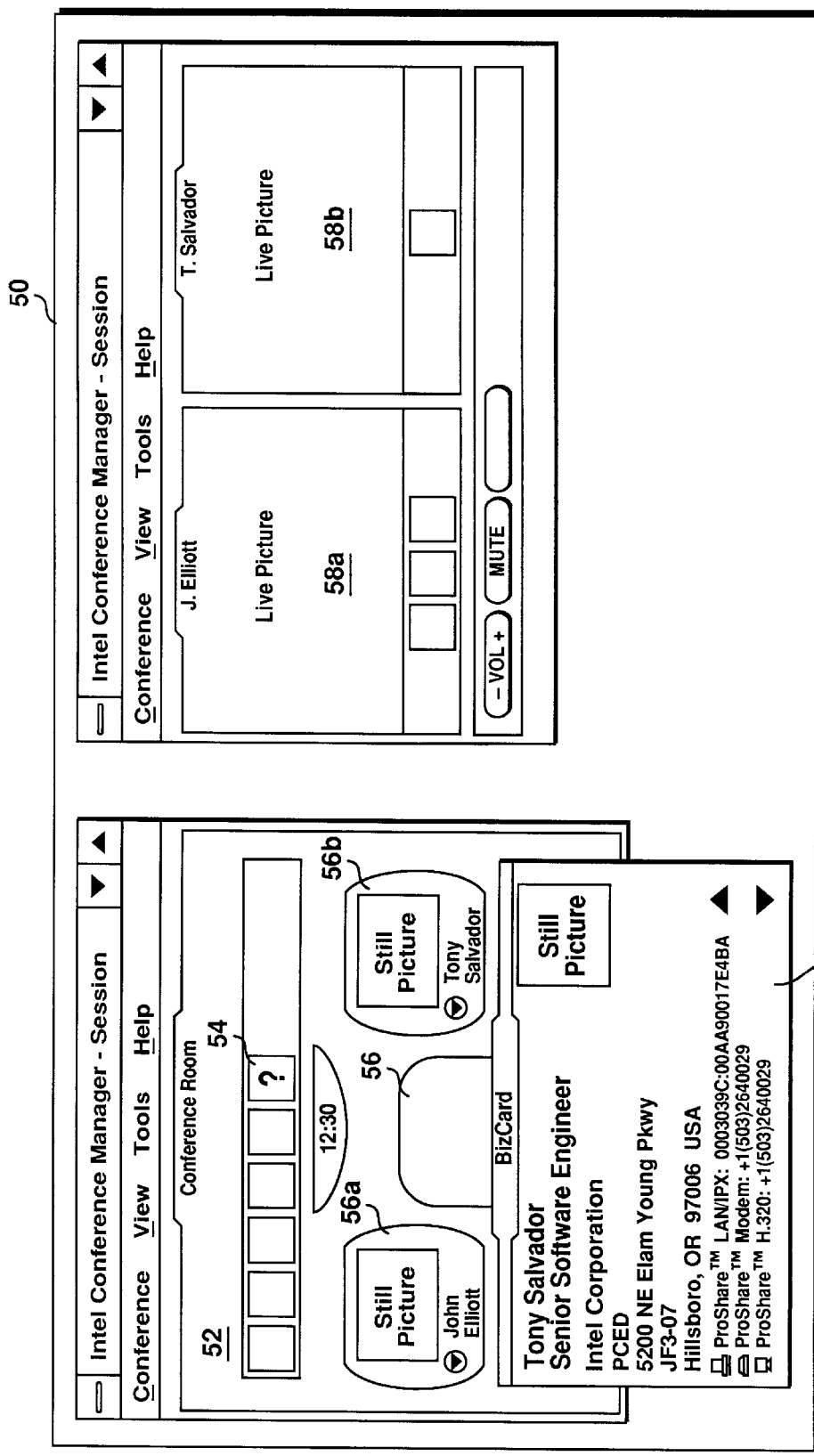
FIGS. 7a–7b illustrate one embodiment of the end user interfaces employed by the additional functions illustrated by FIG. 6a–6b.
Figure 7B:
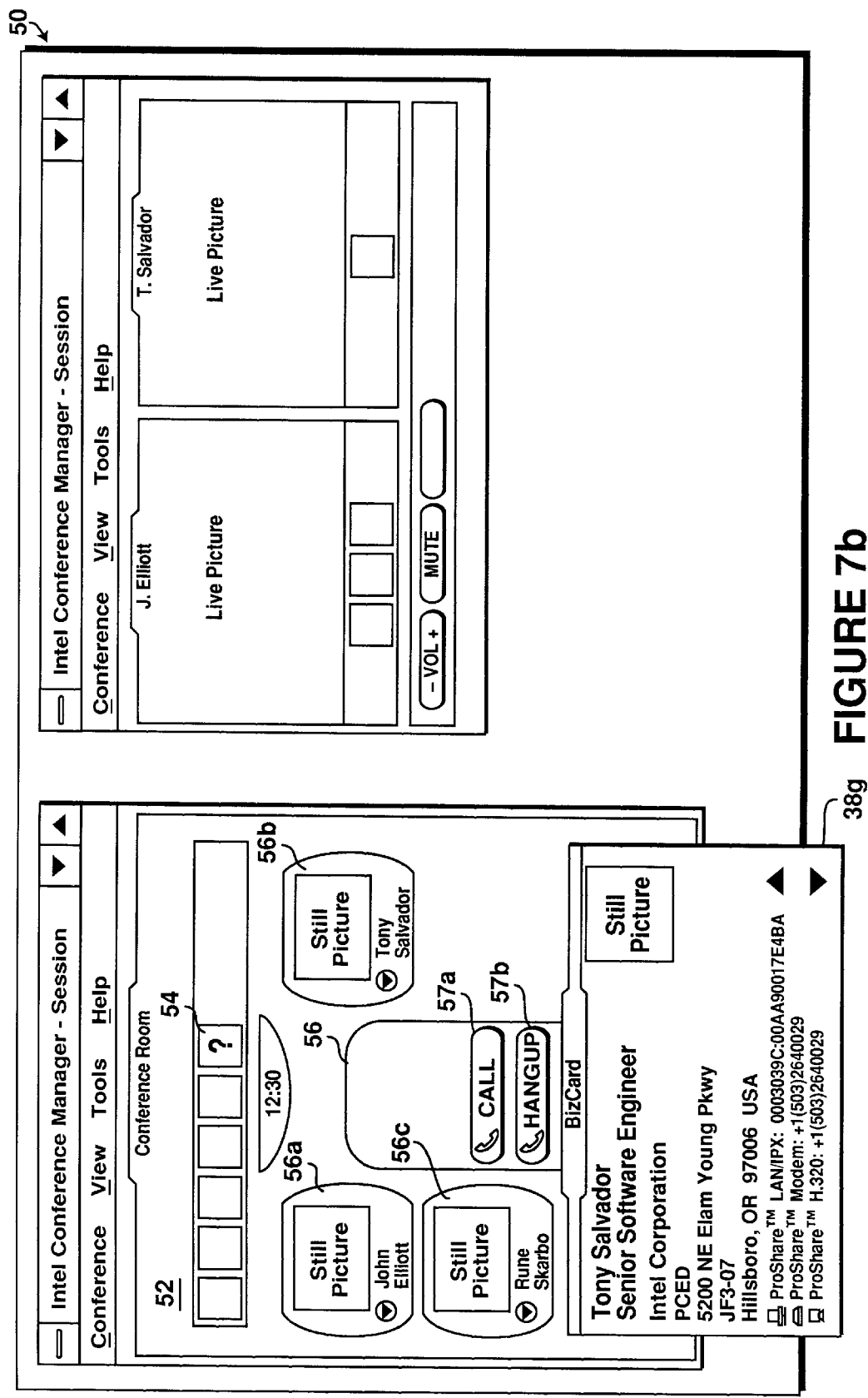

FIGS. 7a–7b illustrate the user interfaces employed by the additional functions illustrated by FIG. 6a–6b. In particular, FIG. 7a illustrates the display of one conference participant's bizcard (Salvador) 38f at another conference participant's conference session window (Elliott) 50, when the two participants first joined together in conference. FIG. 7b illustrates the display of a "new" conference participant's bizcard (Skarbo) 38g at one of the existing conference participant's conference session window (Elliott) 50, when the "new" conference participant is joining a conference in progress (between Elliott and Salvador). As described earlier, bizcards 38f and 38g may be displayed automatically upon receipt, or bizcards 38f and 38g may be displayed upon request, using exemplary command button "?" 54, depending on the conference participant's preference setting. Preferably, notwithstanding an automatic display preference setting, exemplary command button "?" 54 may also be used to re-display the bizcard 38f or 38g of one of the conference participants, whenever the user is interested in doing so during the conference.

Figure 8A:
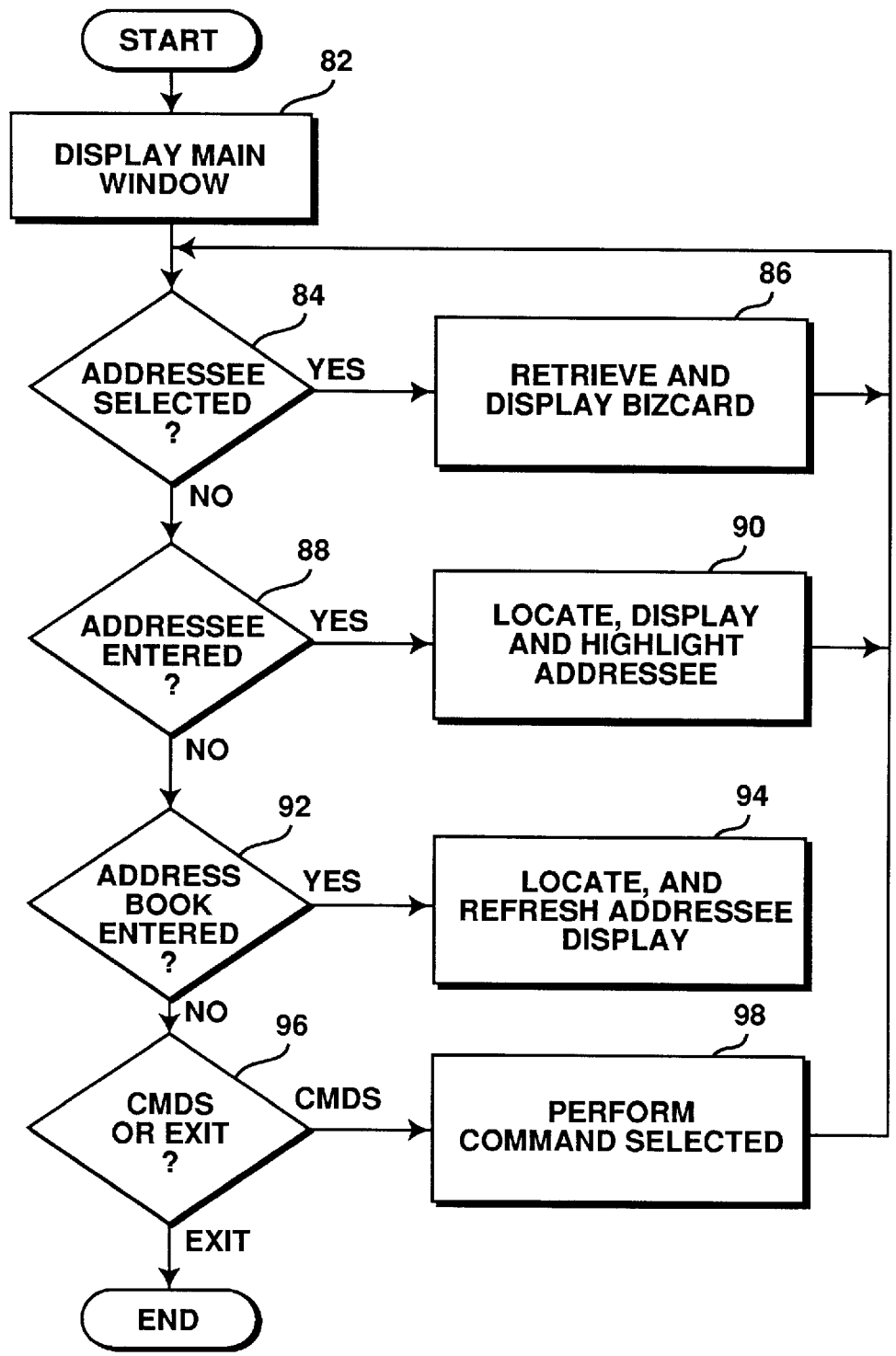
FIGS. 8a–8b illustrate the operational flow of one embodiment of the additional functions incorporated in the address service of FIG. 2 for retrieving, browsing, and re-sending bizcards.
Figure 8B:
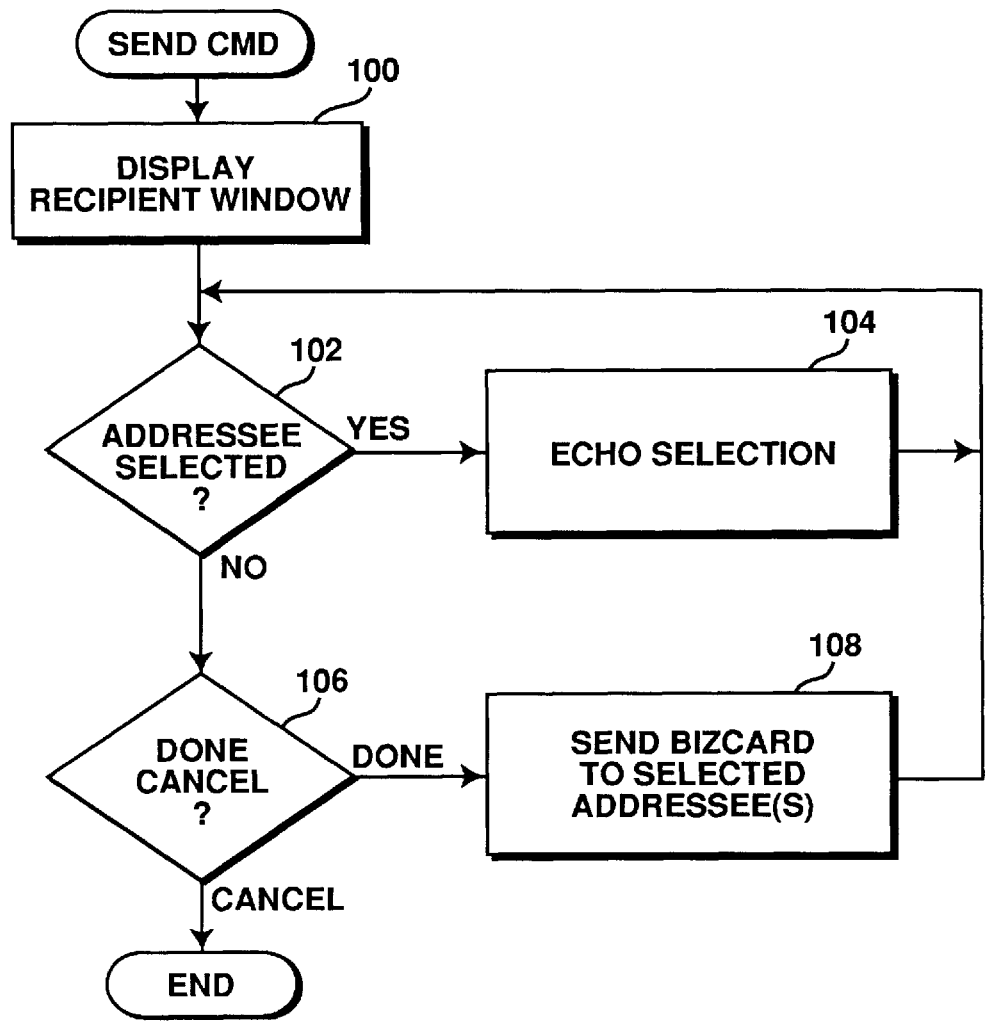

Experience has shown a bizcard 38 similar to the ones illustrated 38a–38g takes about 8 kbytes of data, with the picture consuming most of the 8 kbytes. Thus, their exchange among conference participants impose minimum burden on the data bandwidth of the conferencing system. Referring now to FIGS. 8a–8b, wherein the operational flow of one embodiment of the additional functions incorporated in address service 30 for retrieving, browsing and re-sending bizcards 38 are shown. As illustrated in FIG. 8a, under this embodiment, responsive to invocation of the bizcard function of address service 30, address service 30 displays the "main" window to accept user selections, preferably including a defaulted address book and addressees in the address book, step 82. If the user selects one of the addressees displayed, address service 30 retrieves and displays the selected addressee's bizcard 38 (if it exists), thereby allowing the user to retrieve and browse a previously saved bizcard 38, step 86. On the other hand, if the user enters an addressee, address service 30 locates, scrolls the addressee display if necessary, and highlights the addressee located, step 90. Preferably, address service 30 responds on a keystroke basis, i.e. matching addressee by the most significant characters. However, if the user enters the name of a new address book, address service 30 locates the address book and refreshes the addressees displayed, step 94. Finally, if a command or exit is selected, address service 30 performs the command or exits according, step 98.

As shown in FIG. 8b, preferably address service 30 includes a "Send" command for re-sending retrieved bizcards 38. For this embodiment, responsive to the selection of the "Send" command, address service 30 displays a bizcard recipient selection window including a list of the current conference participants, step 100. Preferably, address service 30 echoes the addressee selections as they are being made, step 104. When the user is finished with making the addressee selection, by selecting an exemplary "Done" command button, address service 30 sends the retrieved bizcard 38 to all selected conference participants, step 108. The user may also cancel the selection and quit, by selecting an exemplary "Cancel" button.

Figure 9A:
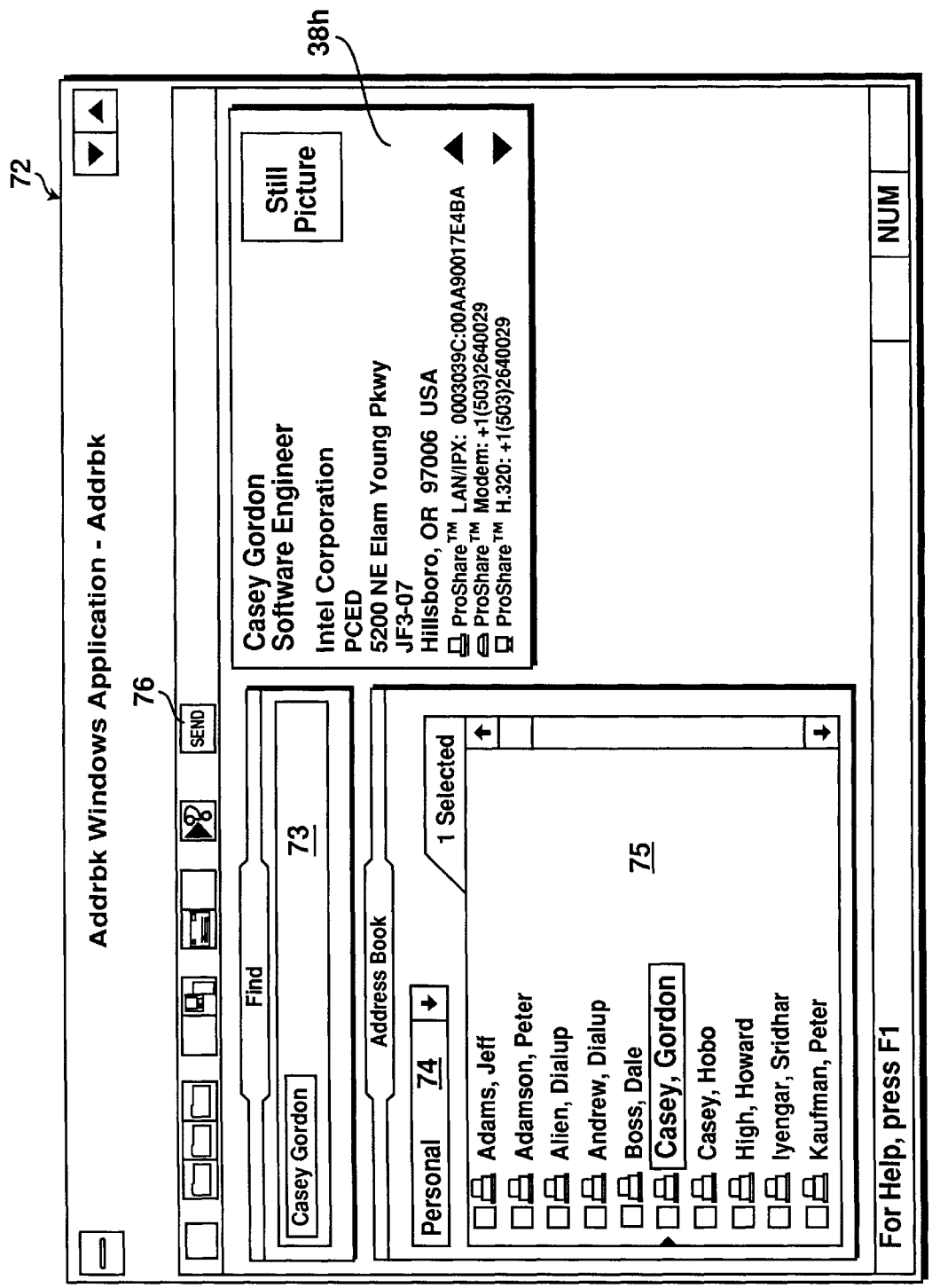
FIGS. 9a–9b illustrate one embodiment of the end user interfaces employed by the additional functions illustrated by FIG. 8a–8b.
Figure 9B:
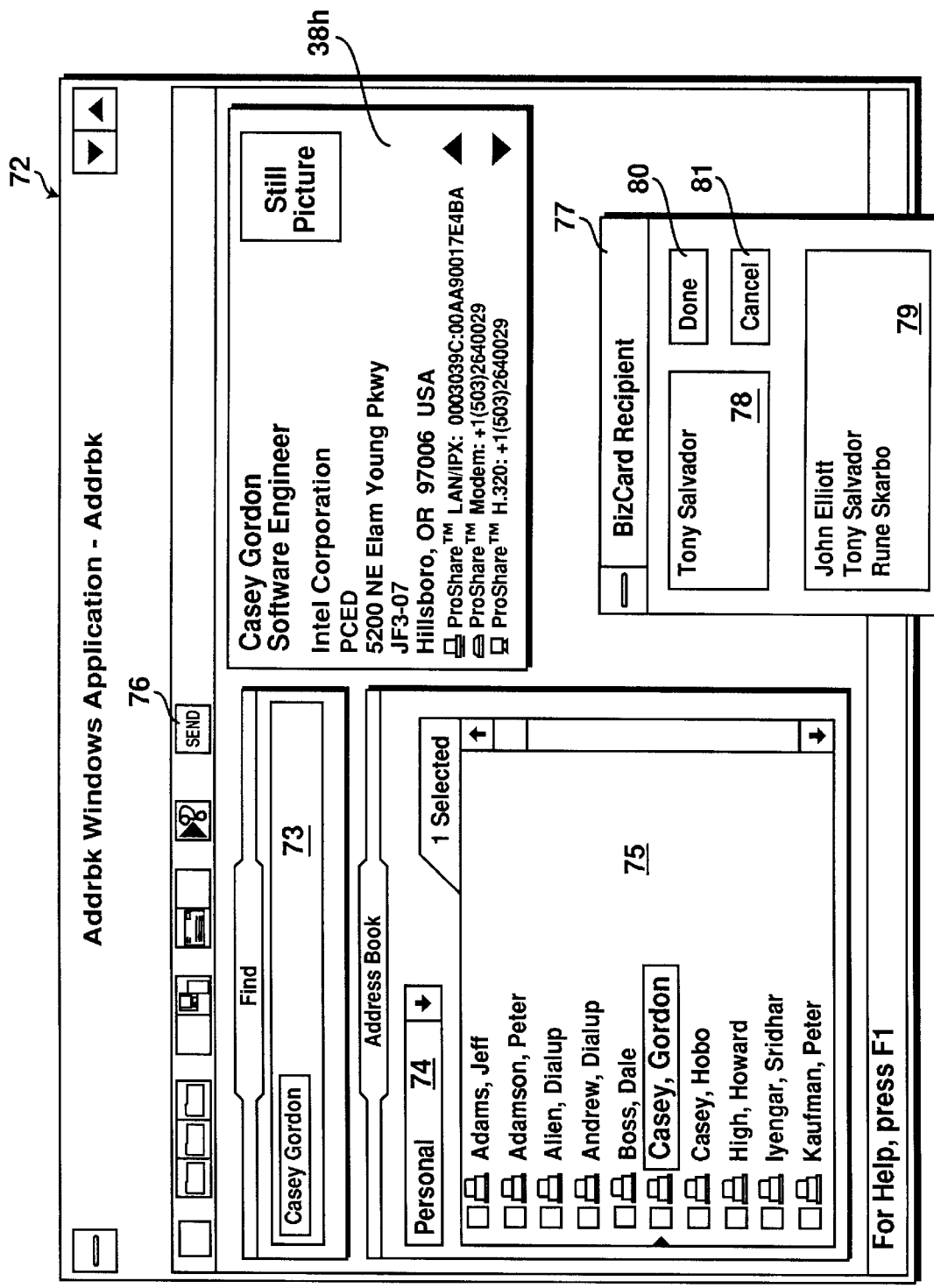

FIGS. 9a–9b illustrate the user interfaces employed by the additional functions illustrated by FIG. 8a–8b. As shown, the bizcard function of address service 30 includes an address book/addressee selection window 72. Address book/addressee selection window 72 includes an addressee display area 75 where the user can make his/her addressee selection. As described earlier, the selected addressee is highlighted, the selected addressee's saved bizcard 38h (if it exists) is displayed. Additionally, address book/addressee selection window 72 also includes a first input area 73 for locating an addressee, and a second input area 74 for switching address book.

For the illustrated embodiment, address book/addressee selection window 72 also include a "Send" command button 76 for re-sending the retrieved bizcard 38h to current conference participants. As shown in FIG. 9b, when the user selects the exemplary "Send" command, a bizcard recipient selection window 77 is displayed. For the illustrated embodiment, bizcard recipient selection window 77 includes current conference participant display area 79 where the user can make his/her bizcard recipient selections). Additionally, bizcard recipient selection window 77 includes selected conference participant display area 78 for echoing the user's selection(s). Lastly, bizcard recipient selection window 77 includes an exemplary "Done" command 80 for ending the selection and causing the retrieved bizcard 38h to be re-sent to the selected conference participants, and an exemplary "Cancel" command 81 for canceling any selection made and exiting without having the retrieved bizcard 38h re-sent.

Thus, a method and apparatus for modeling business card exchanges in a point-to-point or a multi-point personal computer conference has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A personal computer (PC) conference system comprising a general purpose personal conference (GPPC) application having a conference manager that includes a first function for automatically transmitting a business card data structure having information commonly found in business cards for rendering on another PC conference system in a format that resembles a business card to model business card exchanges between conference participants of a face-to-face conference, whenever the PC conference system joins a PC conference.

2. The PC conference system as set forth in claim 1, wherein the transmitted business card data structure includes data necessary to render a picture of the person named by the business card information.

3. The PC conference system as set forth in claim 1, wherein the conference manager further includes a second function for receiving, rendering, and saving a similar business card data structure from its counterpart, whenever the PC conference system joins a point-to-point PC conference, and for receiving, rendering, and saving one or more similar business card data structures whenever the PC conference system joins a multi-point PC conference having at least one other previously joined conference participant.

4. The PC conference system as set forth in claim 3, wherein the second function automatically renders each business card data structure upon receipt if a preference indicator of the conference manager is set to denote a user preference for automatic rendering.

5. The PC conference system as set forth in claim 3, wherein the second function only renders a business card data structure responsive to a user request if a preference indicator of the conference manager is set to denote a user preference for no automatic rendering.

6. The PC conference system as set forth in claim 3, wherein the second function is also used for receiving, rendering, and saving a similar business card data structure from a new PC conference system when the new PC conference system joins the multi-point PC conference in progress, and for replying to the new PC conference system with the business card data structure previously transmitted by the first function at the time the PC conference system joins the multi-point PC conference.

7. The PC conference system as set forth in claim 3, wherein the GPPC application further includes an address service having a third function for retrieving the saved business card data structures for rendering.

8. The PC conference system as set forth in claim 3, wherein the third function is also used for selectively re-sending the retrieved business card data structures to conference participant(s) of a personal conference in progress.

9. The PC conference system as set forth in claim 1, wherein the conference manager also has a second function for setting up the business card data structure for a user.

10. The PC conference system as set forth in claim 9, wherein the second function is invoked automatically during installation of the GPPC application.

11. The PC conference system as set forth in claim 9, wherein the second function includes logic for including a graphical representation of a snapshot of the user as part of the business card data structure.

12. The PC conference system as set forth in claim 11, wherein the second function further includes logic for taking a snapshot of the user.

13. The PC conference system as set forth in claim 12, wherein the second function is also invokable post-installation for editing the previously set up business card data structure.

14. A point-to-point personal conferencing system comprising a first and a second PC conference system, the first and second PC conference systems having a first and a second general purpose personal conference (GPPC) application including a first and a second conference manager having a first and a second function respectively for automatically exchanging a first and a second business card data structure having information commonly found in business cards with each other, whenever the first and the second PC conference systems join each other in a point-to-point PC conference, the exchanged information are to be rendered in a format that resembles a business card on the respective systems, thereby modeling business card exchange between conference participant of a face-to-face conference.

15. The point-to-point personal conferencing system as set forth in claim 14, wherein the first and second conference managers further include a third and a fourth function respectively for receiving, rendering, and saving the first and second business card data structures on the respective systems.

16. The point-to-point personal conferencing system as set forth in claim 15, wherein the third and fourth function automatically and independently render the first and second business card data structures upon receipt on the respective systems if a first and a second preference indicator of the first and second conference managers are set to denote a first and a second independent user preference for automatic rendering respectively.

17. The point-to-point personal conferencing system as set forth in claim 14, wherein the first and second conference managers further include a third and a fourth function for setting up the first and second business card data structures on the respective systems.

18. The point-to-point personal conferencing system as set forth in claim 17, wherein the third and fourth functions include logic for including a first and a second graphical representation of a first and a second snapshot of a first and a second user on the respective systems as part of the first and second business card data structures.

19. The point-to-point personal conferencing system as set forth in claim 14, wherein the first and second business card data structures are saved upon receipt, and the first and second GPPC applications further include a first and a second address service having a third and a fourth function respectively for selectively retrieving the saved first and second business card data structures, and rendering the retrieved first and second business card data structures on the respective systems.

20. The point-to-point personal conferencing system as set forth in claim 19, wherein the third and fourth functions include logic for selectively re-sending the retrieved first and second business card data structures respectively.

21. A multi-point personal conferencing system comprising:

a first, a second and a third PC conference system, the first, second and third PC conference systems having a first, a second and a third general purpose personal conference (GPPC) application including a first, a second and a third conference manager having a first, a second and a third function respectively for automatically exchanging a first, a second and a third business card data structures having information commonly found in business cards to each other, whenever the first, the second and the third PC conference systems join each other in a multi-point PC conference, the exchanged information are to be rendered in a format that resembles a business card on the respective systems.

22. The multi-point personal conferencing system as set forth in claim 21, wherein the first, second and third conference managers further include a fourth, a fifth and a sixth function for setting up the first, second and third business card data structures on the respective systems.

23. The multi-point personal conferencing system as set forth in claim 22, wherein the fourth, fifth and sixth functions include logic for including a first, a second and a third graphical representation of a first, a second and a third snapshot of a first, a second and a third user on the respective systems as part of the first, second and third business card data structures.

24. The multi-point personal conferencing system as set forth in claim 21, wherein the first, second and third business card data structures are saved upon receipt, and the first, second and third GPPC applications further include a first, a second and a third address service having a fourth, a fifth and a sixth function respectively for selectively retrieving the saved second or third, third or first, and first or second business card data structures, and rendering the retrieved business card data structures on the respective systems.

25. The multi-point personal conferencing system as set forth in claim 24, wherein the fourth, the fifth and the sixth functions include logic for selectively re-sending the retrieved business card data structures respectively.

26. The multi-point personal conferencing system as set forth in claim 21, wherein the first, second and third conference managers further include a fourth, a fifth and a sixth function respectively for receiving, rendering, and saving the second and third, the third and first, and the first and second business card data structures on the respective systems.

27. The multi-point personal conference system as set forth in claim 26, wherein the fourth, the fifth, and the sixth function are also used for receiving, rendering, and saving a fourth business card data structure on the respective systems from a fourth personal computer conference system when the fourth personal computer conference system joins the multi-point PC conference in progress, and for replying to the fourth personal computer conference system with the first, second, and third business card data structures respectively.

28. The multi-point personal conferencing system as set forth in claim 26, wherein the fourth, fifth and sixth functions automatically and independently render the second and third, the third and first, and the first and second business card data structures upon receipt on the respective systems if a first, a second and a third preference indicator of the first, second and third conference managers are set to denote a first, a second and a third independent user preference for automatic rendering respectively.

* * * * *